Figure 3:
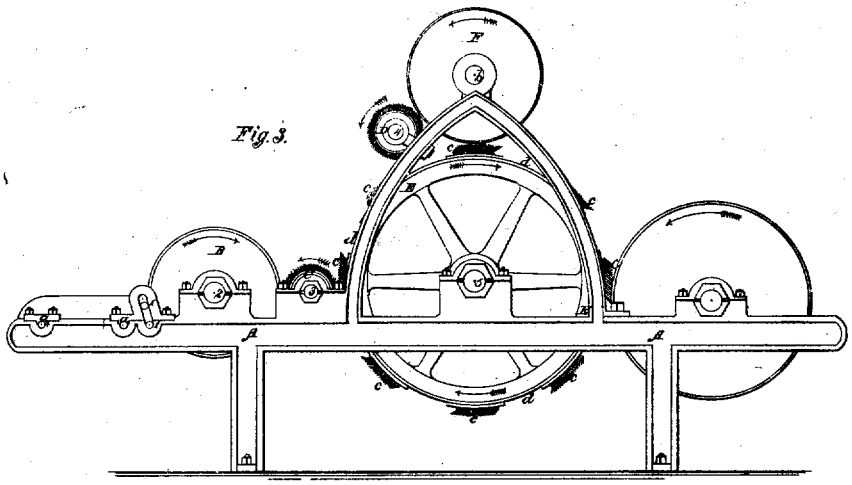

S. R. Parkhurst,
Carding Machine.

No 532. Reissued Feb. 23, 1858.

Witnesses,

Charles Smith

Lemuel W. Sewell

Inventor,

S. R. Parkhurst

N. PETERS, PHOTO-LITHOGRAPHER, WASHINGTON, D. C.

UNITED STATES PATENT OFFICE.

S. R. PARKHURST, OF NEW YORK, N. Y.

IMPROVEMENT IN CARDING-MACHINES.

Specification forming part of Letters Patent No. 5,643, dated June 20, 1848; Reissue No. 532, dated February 23, 1858.

*To all whom it may concern:*

Be it known that I, STEPHEN R. PARKHURST, of the city of New York, late of West Bloomfield, Orange county, New Jersey, machinist, have invented, made, and applied to use certain new and useful Improvements in Machinery for Carding Cotton, Wool, Flax, or other fibrous materials preparatory to spinning the same into yarn; that such improvements are generally and substantially based upon the particulars set forth in a caveat entered by me in the Patent Office on or about the 29th day of August, 1846, and for which improvements, as now completed by me, I seek Letters Patent of the United States; and I do hereby declare that the said improvements and the mode of applying, conjoining, and operating the same are fully and substantially set forth and shown in the following description and in the drawings annexed to and making part of this specification, wherein—

Figure 2:
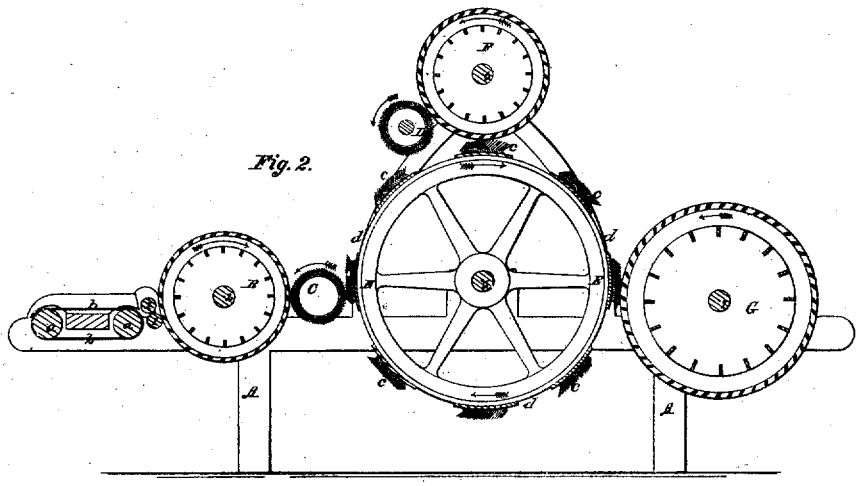
Figure 1:
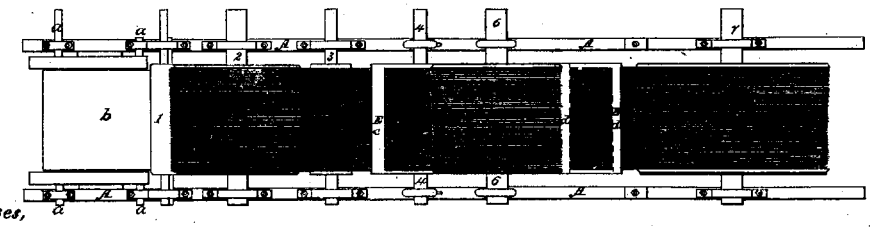

Figure 1 is a plan, Fig. 2 is a sectional elevation, and Fig. 3 is a side elevation, of a carding-machine as made and used by me for these purposes.

The same letters and numbers as marks of reference apply to the same parts in each of the several figures.

A is the frame carrying the working parts of the machine, made of wood or metal or both. *a a* are two shafts and rollers that carry the feeding-apron *b*, and 1 1 are the feeding-rollers, fitted in any usual manner. 2 is a shaft to receive a drum to drive and carry the first cylinder, B. 3 is a shaft to receive a drum to carry and drive the first small cylinder, *c*. 4 is a shaft to receive a drum and carry and drive the second small cylinder, D. These cylinders C and D are fully covered with card-teeth, and the cylinder D is mounted on an auxiliary frame, that also carries the shaft 6 and cylinder F. Beneath these cylinders D and F a shaft, 5, on the main frame is to receive a drum and carry and drive the larger cylinder E, which is fitted as an intermitted carding-cylinder with card-sheets *c'* that have intermittent spaces, *d*, between them. Beyond the cylinder E is the cylinder G, mounted on a shaft, 7, which receives a drum to drive the cylinder.

The cylinders B, F, and G are made with flat rings of hooked teeth, with packing between them, conformably to the description in a patent of the United States issued to me on the 1st day of May, 1845, the specification of which bears date the 29th day of July, 1844, and to which Letters Patent reference is hereby made for a constructive description thereof. The speed of a point on the surface of the first cylinder, B, being assumed as one foot, the speed of a point on the cylinders C and D is to be equal to two feet in the same time. The speed in like manner of a point on the large intermittently-fitted cylinder E is to be equal to at least one-third more than the speed of the cylinders C and D. The speed of a point on the hooked tooth-cylinder F is only to be equal to about one-twentieth of the speed of the cylinder E, and the speed of a point on the final cylinder, G, is also only to be equal to about one-twentieth of the speed of a point on the large cylinder E. These severally-proportioned speeds of a point on the face of each cylinder are to be given or determined, in the usual manner, by calculating the relative sizes of the drums or pulleys of each cylinder in comparison with the size of the respective cylinders and the drum from which the motive power is derived. Each cylinder is to be driven in the direction of the curved arrow upon it. When thus completed and the proportionate speeds of the several cylinders duly adjusted, as above set forth, the material to be operated on is to be entered by the apron *b* and rollers 1 1, the material passing from the cylinders B and C is taken by the cylinder E onto the cylinder F, which, by its peculiar construction, is adapted to hold onto all the knobby, lumpy, or matted fibrous material until the cylinder E has opened it all out, and any portion that holds onto and goes around with the cylinder F is taken off that by the cylinder D, and taken from that by the cylinder E to the cylinder F again. In this arrangement the cylinder B acts as a comber, and in this mode of using it the cylinder F becomes a worker in unison with common wire card-cylinders, and thus prasents a new mode of carding wool or other fibrous material that prevents the material coming out of the machine in the state that is technically termed "knobbed," because the stability of the teeth in the cylinder F prevents any knobby portion of the material from depressing them as the mass rolls under them in the manner in which such knobby portions will and do depress the wire teeth of the common workers in carding-machines. Therefore, the application of the cylinder F as a worker effects the carding of fibrous material in a better manner than can be attained with the common wire-tooth worker, and the hooked-tooth steel-ring cylinder G acts as a doffer with a like and proportionate effect on the material presented to it by the cylinder E, and any usual mechanical means will take the material from the cylinder G in an equal and continuous sheet, bat, or sliver.

The cylinders B, F, and G are shown in the drawings as about one-third the proper diameter for full work, and if the proportions between these and the cylinders C, D, and E are maintained an effective carding-machine is placed within a very small compass; but if the proportionate speeds or nearly those as stated for the travel of a point on the several surfaces is maintained the cylinders C, D, and E may be made larger than shown in the drawings, if such enlargement is found useful; and I do not hereby confine myself to the number of steel-ring toothed cylinders, as more or less may be used without any substantial departure from the general arrangement herein described and shown.

What I claim as new and of my own invention, and desire to secure by Letters Patent of the United States, is—

The application of the steel-ring hooked-tooth cylinder or cylinders to act as combers, workers, or doffers, in combination with common wire-tooth carding, for the purpose of quicker and more effectively opening wool and other fibrous material, substantially in the manner described and shown.

In witness whereof I have hereunto set my signature this 29th day of September, 1857.

S. R. PARKHURST.

Witnesses:
LEMUEL W. SERRELL,
C. KESSLER SMITH.